US008250103B2

(12) United States Patent
Ohsawa

(10) Patent No.: US 8,250,103 B2
(45) Date of Patent: Aug. 21, 2012

(54) IMAGE LOG MANAGEMENT DEVICE, IMAGE LOG MANAGEMENT METHOD, IMAGE LOG MANAGEMENT PROGRAM

(75) Inventor: Takashi Ohsawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 434 days.

(21) Appl. No.: 12/243,870

(22) Filed: Oct. 1, 2008

(65) Prior Publication Data

US 2009/0240740 A1 Sep. 24, 2009

(30) Foreign Application Priority Data

Mar. 24, 2008 (JP) ................................. 2008-076472

(51) Int. Cl.
*G06F 17/30* (2006.01)
(52) U.S. Cl. ..................................... 707/792; 707/999.2
(58) Field of Classification Search ........................ None
See application file for complete search history.

(56) References Cited

U.S. PATENT DOCUMENTS

2007/0008593 A1 1/2007 Sato
2008/0005176 A1 1/2008 Shimizu

FOREIGN PATENT DOCUMENTS

| CN | 101098386 A | 1/2008 |
|---|---|---|
| JP | 8-320819 A | 12/1996 |
| JP | 2007-19917 A | 1/2007 |
| JP | 2007-088795 A | 4/2007 |

OTHER PUBLICATIONS

Chinese Office Action dated Aug. 26, 2010 from corresponding Chinese Office Action 200810174040.2.
Notice of Reasons for Rejection issued Jun. 5, 2012 in corresponding Japanese Patent Application No. 2008-076472.

*Primary Examiner* — Jean B Fleurantin
*Assistant Examiner* — Anteneh Girma
(74) *Attorney, Agent, or Firm* — Sughrue Mion, PLLC

(57) ABSTRACT

An image log management device that includes a correspondence relationship information storing component, an image log data storage component, an input component and a deletion component is provided. The correspondence relationship information storing component stores correspondence relationship information between an identifier of an input document subject to image forming processing, an identifier of an output document resulting from the image forming processing of the input document, and an identifier of image log data of the output document. The image log data storage component stores the image log data of the output document. The input component inputs document disposal information including an identifier of a disposal document that has been disposed of The deletion component, based on the document disposal information and based on the correspondence relationship information, selects the image log data requiring deletion and executes deletion processing thereon.

18 Claims, 22 Drawing Sheets

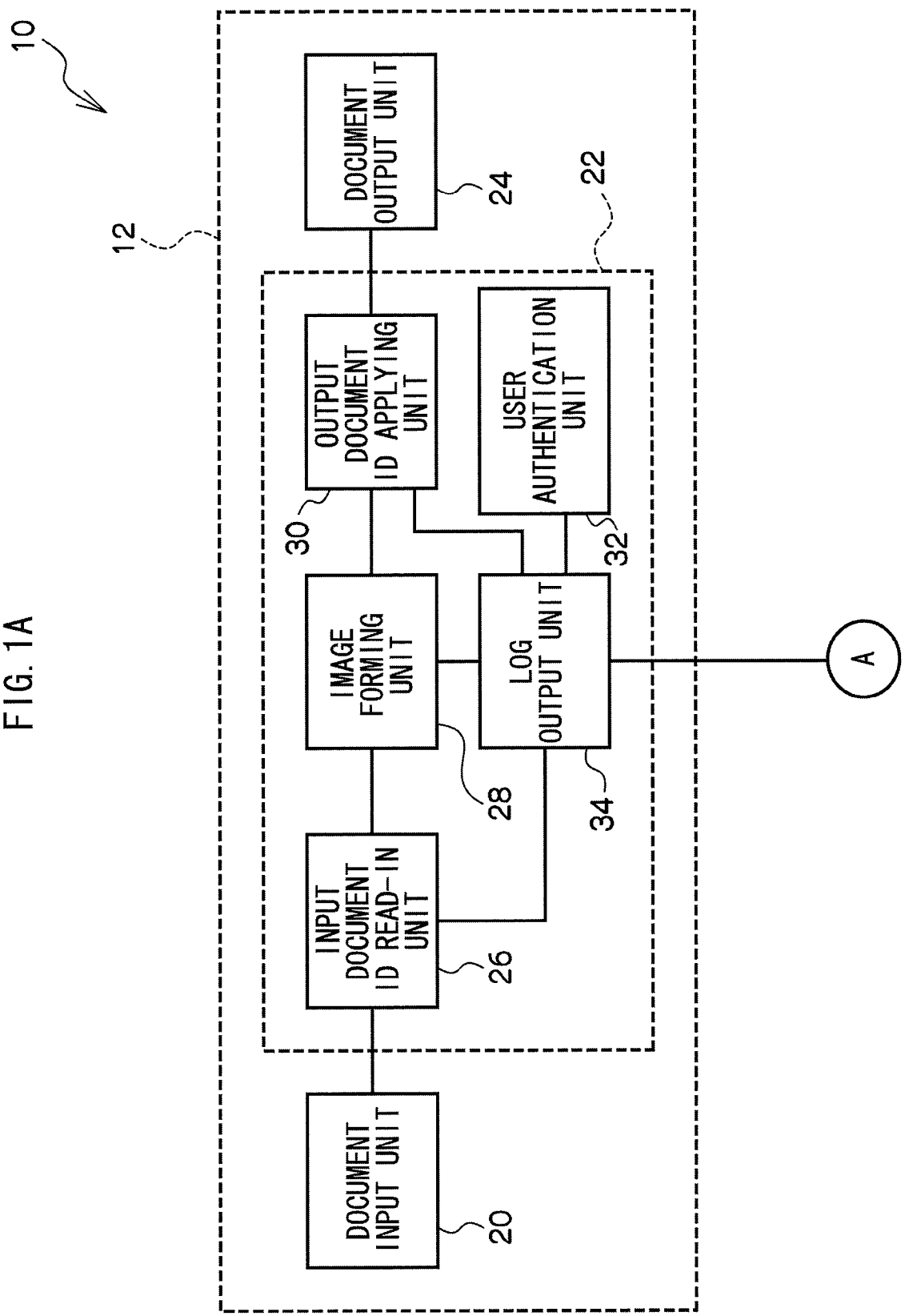

FIG. 2

| JOB ID | INPUT DOCUMENT ID | OUTPUT DOCUMENT ID | IMAGE LOG ID | USER ID | EXECUTION DATE/TIME | IP ADDRESS |
|---|---|---|---|---|---|---|
| 1 | 1 | 2 | IL1 | U001 | 2007/11/01 | 192.168.0.1 |
| 2 | 2 | 3, 4 | IL2 | U002 | 2007/11/15 | 192.168.0.1 |
| 3 | 3 | 5, 6, 7 | IL3 | U003 | 2007/12/08 | 192.168.0.1 |
| 4 | 3 | 8 | IL4 | U004 | 2007/12/13 | 192.168.0.1 |
| ... | ... | ... | ... | ... | ... | ... |

| JOB ID | TREE ID | INPUT DOCUMENT ID | OUTPUT DOCUMENT ID | IMAGE LOG ID | IMAGE LOG LOCATION INFORMATION |
|---|---|---|---|---|---|
| 1 | 1 | 1 | 2 | IL1 | \ILDATA\IL1 |
| 2 | 1 | 2 | 3, 4 | IL2 | \ILDATA\IL2 |
| 3 | 1 | 3 | 5, 6, 7 | IL3 | \ILDATA\IL3 |
| 4 | 1 | 3 | 8 | IL4 | \ILDATA\IL4 |
| ... | ... | ... | ... | ... | ... |

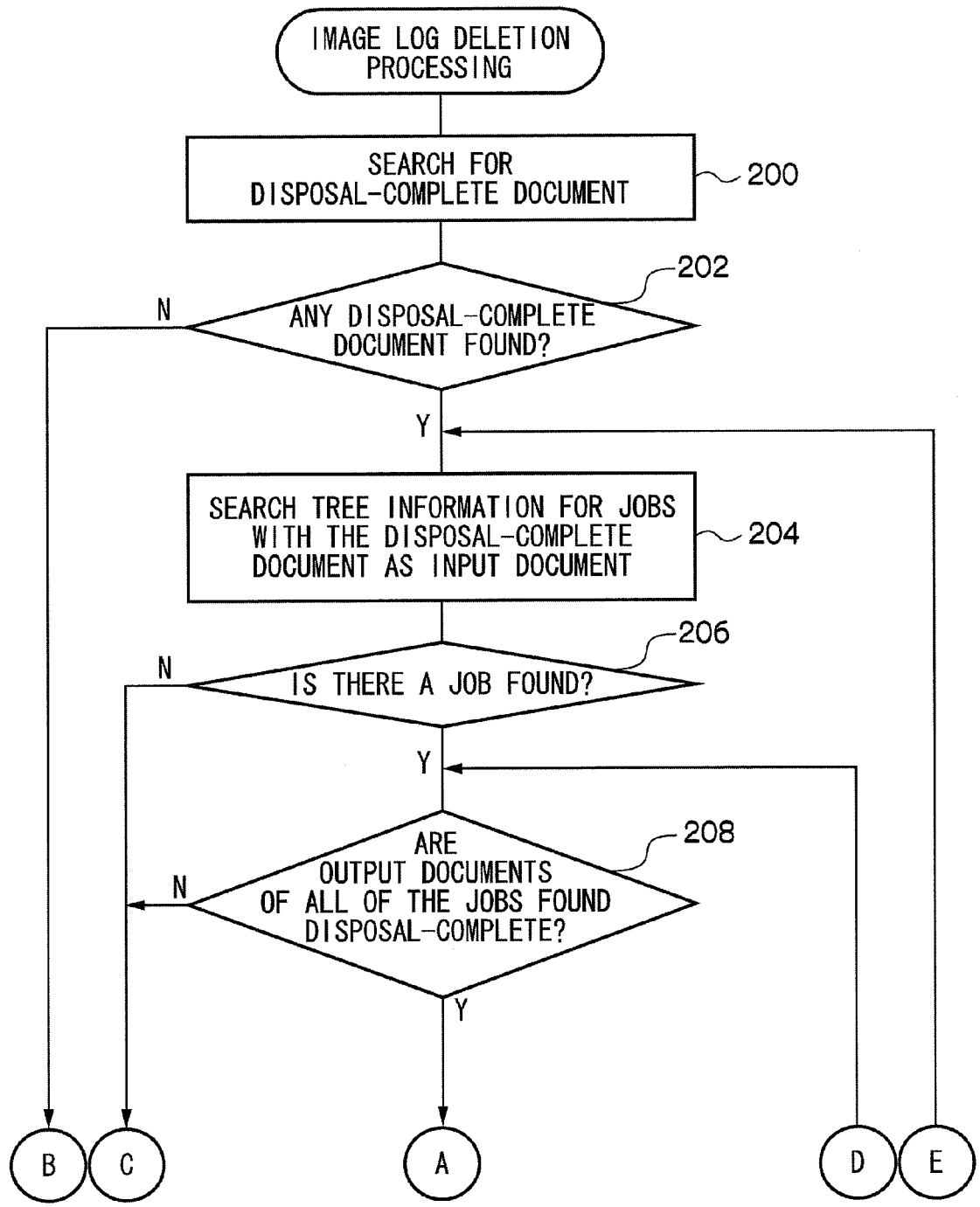

FIG. 14

| JOB ID | TREE ID | INPUT DOCUMENT ID | OUTPUT DOCUMENT ID | IMAGE LOG ID | IMAGE LOG LOCATION INFORMATION |
|---|---|---|---|---|---|
| 1 | 1 | 1 | 2 | IL1 | \ILDATA\IL1 |
| 2 | 1 | 2 | 3, 4 | IL2 | \ILDATA\IL2 |
| 3 | 1 | 3 | 5, 6, 7 | IL3 | DISPOSAL-COMPLETE |
| 4 | 1 | 3 | 8 | IL4 | \ILDATA\IL4 |
| ... | ... | ... | ... | ... | ... |

60

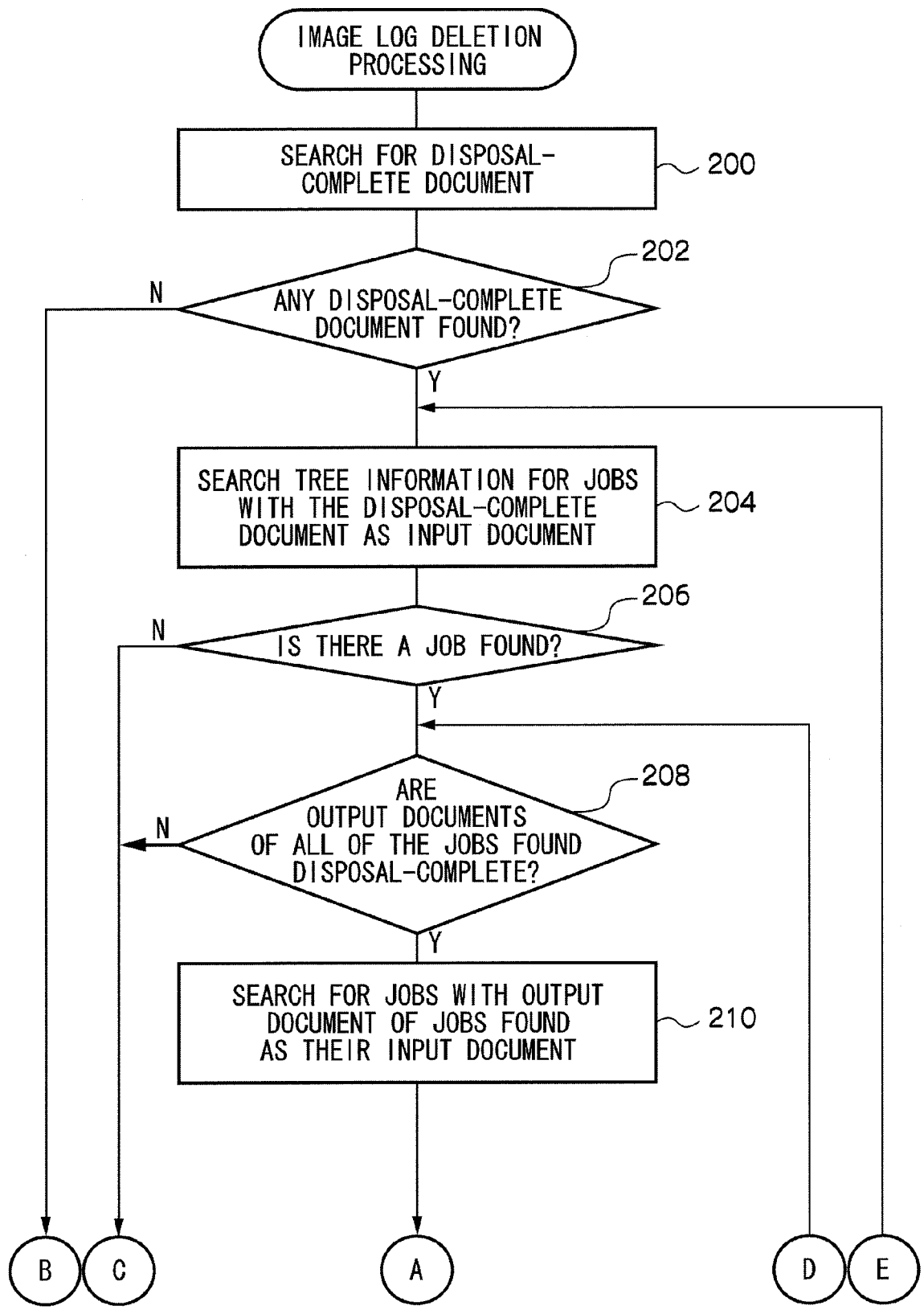

FIG. 16

| JOB ID | TREE ID | INPUT DOCUMENT ID | OUTPUT DOCUMENT ID | IMAGE LOG ID | IMAGE LOG LOCATION INFORMATION |
|---|---|---|---|---|---|
| 1 | 1 | 1 | 2 | IL1 | \ILDATA\IL1 |
| 2 | 1 | 2 | 3,4 | IL2 | \ILDATA\IL2 |
| 4 | 1 | 3 | 8 | IL4 | \ILDATA\IL4 |
| ... | ... | ... | ... | ... | ... | star
IMAGE LOG MANAGEMENT DEVICE, IMAGE LOG MANAGEMENT METHOD, IMAGE LOG MANAGEMENT PROGRAM

CROSS-REFERENCE TO RELATED APPLICATION

This application is based on and claims priority under 35 USC 119 from Japanese Patent Application No. 2008-076472, filed Mar. 24, 2008.

BACKGROUND

1. Technical Field

The present invention relates to an image log management device, image log management method and an image log management program.

2. Related Art

As a result of a number of leaks of confidential business information and personal information, there is a growing awareness of the need for technology to prevent leaks of information and to investigate such cases if they occur. Technology has recently been developed for recording on a server large volumes of log information, including job log information relating to the circumstances in which image forming devices with a facsimile function, printer function, or the like were used, such as "who", "when", "on which device", "what processed", and "how processed", and including image log data representing the images formed by the image forming device.

However, there is also a growing awareness of the importance of record management, the managing of important documents throughout their lifecycles, and the disposal of such documents in line with set periods of retention. Various proposals have been made for related technology, technology for scanning in documents when they are withdrawn for disposal, detecting document IDs applied to the documents by reading these in, identifying thereby which documents have been withdrawn and disposed, and managing the status of each of the documents.

SUMMARY

According to an aspect of the invention, there is provided an image log management device. The image log management includes: a correspondence relationship information storing component that stores correspondence relationship information between an identifier of an input document subject to image forming processing, an identifier of an output document resulting from the image forming processing of the input document, and an identifier of image log data of the output document; an image log data storage component that stores the image log data of the output document; an input component that inputs document disposal information including an identifier of a disposal document that has been disposed of, and a deletion component that, based on the document disposal information and based on the correspondence relationship information, selects the image log data requiring deletion and executes deletion processing thereon.

BRIEF DESCRIPTION OF THE DRAWINGS

Exemplary embodiments of the present invention will be described in detail based on the following figures, wherein:

FIG. 1A and FIG. 1B are schematic configuration diagrams of an image log management system;

FIG. 2 is a diagram showing an example of job log information;

FIG. 3 is a diagram showing an example of tree information according to a first exemplary embodiment of the present invention;

FIG. 7A and FIG. 7B are flow charts showing image log deletion processing according to the first exemplary embodiment of the present invention;

FIG. 14 is a diagram showing an example of tree information according to the second exemplary embodiment of the present invention;

FIG. 15A and FIG. 15B are flow charts showing image log deletion processing according to a third exemplary embodiment of the present invention;

FIG. 16 is a diagram showing an example of tree information according to the third exemplary embodiment of the present invention;

DETAILED DESCRIPTION

First Exemplary Embodiment

Explanation will now be given of a first exemplary embodiment of the present invention.

Figure 1B:
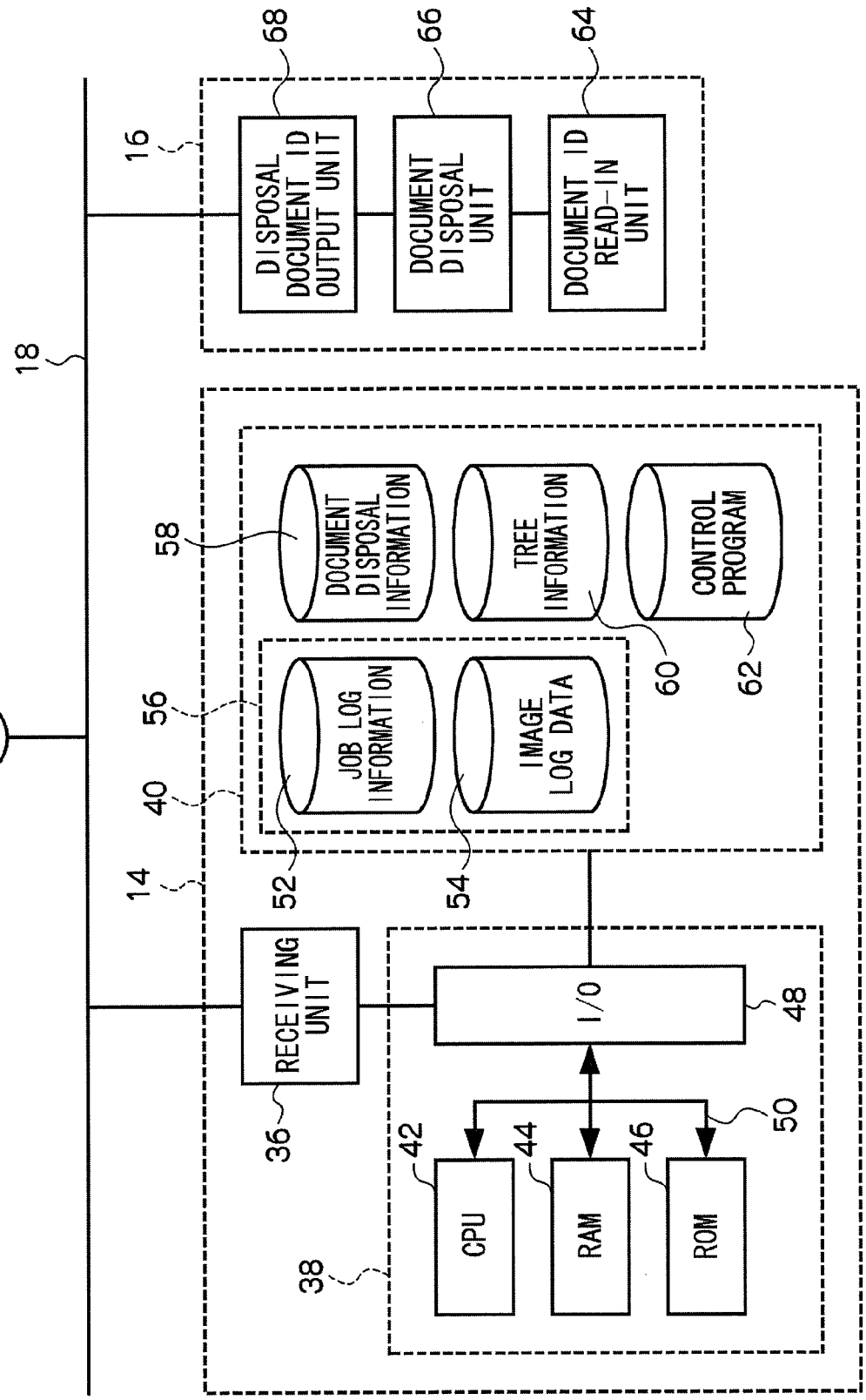

A schematic configuration of an image log management system 10 according to the first exemplary embodiment is shown in FIG. 1A and FIG. 1B. The image log management system 10 is, as shown in the figure, configured with an image forming device 12, an image log management device 14 and a document disposal device 16, these being connected together via a network 18. It should be noted that a case of a single image forming device 12 is shown in FIG. 1A and FIG. 1B, and a configuration may be made with plural of the image forming devices 12 connected by the network 18.

The image forming device 12 is configured to include a document input unit 20, a document processing unit 22 and a document output unit 24.

The document input unit 20 is, for example, configured with an image read-in device such as a scanner. The document input unit 20 may also be configured with a receiver that receives document data sent from other computers connected to the network 18, with a receiver that receives document data transmitted as a facsimile via a telephone line, or with another receiver.

When the document input unit 20 is configured from an image read-in device, a paper document recorded with, for example, images, text and the like, is read in and the document data read in from the paper document is output to the document processing unit 22. Received document data is output to the document processing unit 22 when the document input unit 20 is configured from a receiver.

The document processing unit 22 is configured to include an input document ID read-in unit 26, an image forming unit 28, an output document ID application unit 30, a user authentication unit 32, and a log output unit 34.

The input document ID read-in unit 26 reads in the ID applied to the document input by the document input unit 20. Such an ID is, for example, configured as an identifier including numbers and characters, and methods for applying the ID to documents include methods such as: applying the ID as it is to the document; applying a one-dimensional code or two-dimensional code, such as a bar-code, QR code or the like, representing the ID to the document; applying a digital watermark to the document; and applying an IC chip recorded with the ID to the document. The input document ID read-in unit 26 therefore has the functionality for reading in the ID that has been applied to the document using a read-in method compatible with the ID application method used. It should be noted that when no input document ID is read in then a new input document ID is applied thereto.

The image forming unit 28 forms an image that is based on the document data input from the document input unit 20 on a recording medium such as paper using, for example, an electrophotographic or inkjet recording method, and outputs the image formed on the recording medium as an output document to the output document ID application unit 30, or the image forming unit 28 carries out specific image processing to an input document and outputs the image processed document as an output document to the output document ID application unit 30.

The image forming unit 28 also outputs, as image log data, image data of the formed image to the log output unit 34, for saving as a record of the image processing. The image log data may be the output document as it is, it may be data reduced in amount by lowering the definition and compressing, and it may also be a drawing instruction for generating the image data.

The output document ID application unit 30 applies an output document ID to a recording medium on which an image has been formed by the image forming unit 28 based on document data, and also applies an output document ID to an output document from carrying out specific image processing to an input document. The ID may be printed, or a bar-code or the like representing the ID may be printed when, for example, output document IDs are applied to a recording medium. The image forming unit 28 may also be configured to include the output document ID application unit 30, and may combine the image of the input document with the output document ID, and form the combined image on the recording medium.

The user authentication unit 32 is configured to include: an input section that inputs user information such as user IDs, passwords and the like; a storage section that stores user information of users permitted to use the image forming device 12; an editing section that changes and deletes user information stored in the storage section; and a comparison section that carries out a comparison of input user information against user information stored in the storage section.

For example, each time the document processing unit 22 executes a job such as copying or scanning the log output unit 34, generates job log information, which is history information accompanying the job execution, and outputs to the image log management device 14 log information containing the generated job log information and image log data output from the image forming unit 28.

The job log information, for example as shown in FIG. 2, includes information of: a job ID applied to each job; an input document ID read in by the input document ID read-in unit 26; an output document ID applied by the output document ID application unit 30; an image log ID applied to the image log; a user ID of the user who executed the job; the execution date/time of the job; and the IP address and the like of the image forming device 12. It should be noted that the job ID, input document ID, output document ID, image log ID included in the image log information may, for example, have a fixed ID applied thereto for each image forming device.

The image log management device 14 is configured to include a receiving unit 36, a controller 38, and a storage unit 40.

The receiving unit 36 receives log information sent from the image forming device 12 through the network 18, and receives later described document disposal information sent from the document disposal device 16 through the network 18, and outputs to the controller 38.

The controller 38 is configured, as an example, by a computer with a CPU 42, a RAM 44, a ROM 46 and an input/output interface (I/O) 48, mutually connected together through a BUS 50.

The CPU 42 stores log information 56, which includes job log information 52 sent from the image forming device 12 and image log data 54, in the storage unit 40 and also stores document disposal information 58 sent from the document disposal device 16 therein.

The CPU 42 generates tree information 60, as shown in FIG. 3, based on the log information 56.

The tree information 60 is information obtained by extracting from the log information 56 job IDs, the input document ID, output document ID, and image log ID therefor, adding a tree ID to identify the tree representing the relationship between the documents and the job, and adding location information of the image log, namely image log location information representing the storage address of the image log on the storage unit 40.

The tree is one representing what type of document has been processed and output by what type of job, in other words it is a tree showing the document process history.

The tree can consequently be represented by the job ID of a given job (for example, copying) together with the document ID of input document(s) to this job (documents subject to this processing) and the document ID of output document(s) from this job (documents after processing).

When the log information 56 for a given job is received, if the tree information 60 includes the same input document ID or the same output document ID as the input document ID of the job log information 52 of the received log information 56, the CPU 42 applies the same tree ID as the tree ID of the input document ID or output document ID that is the same. Namely, when log information 56 is received for an input document of a document of an existing tree, the tree ID of that tree is applied thereto and the tree information 60 is generated.

Figure 4:
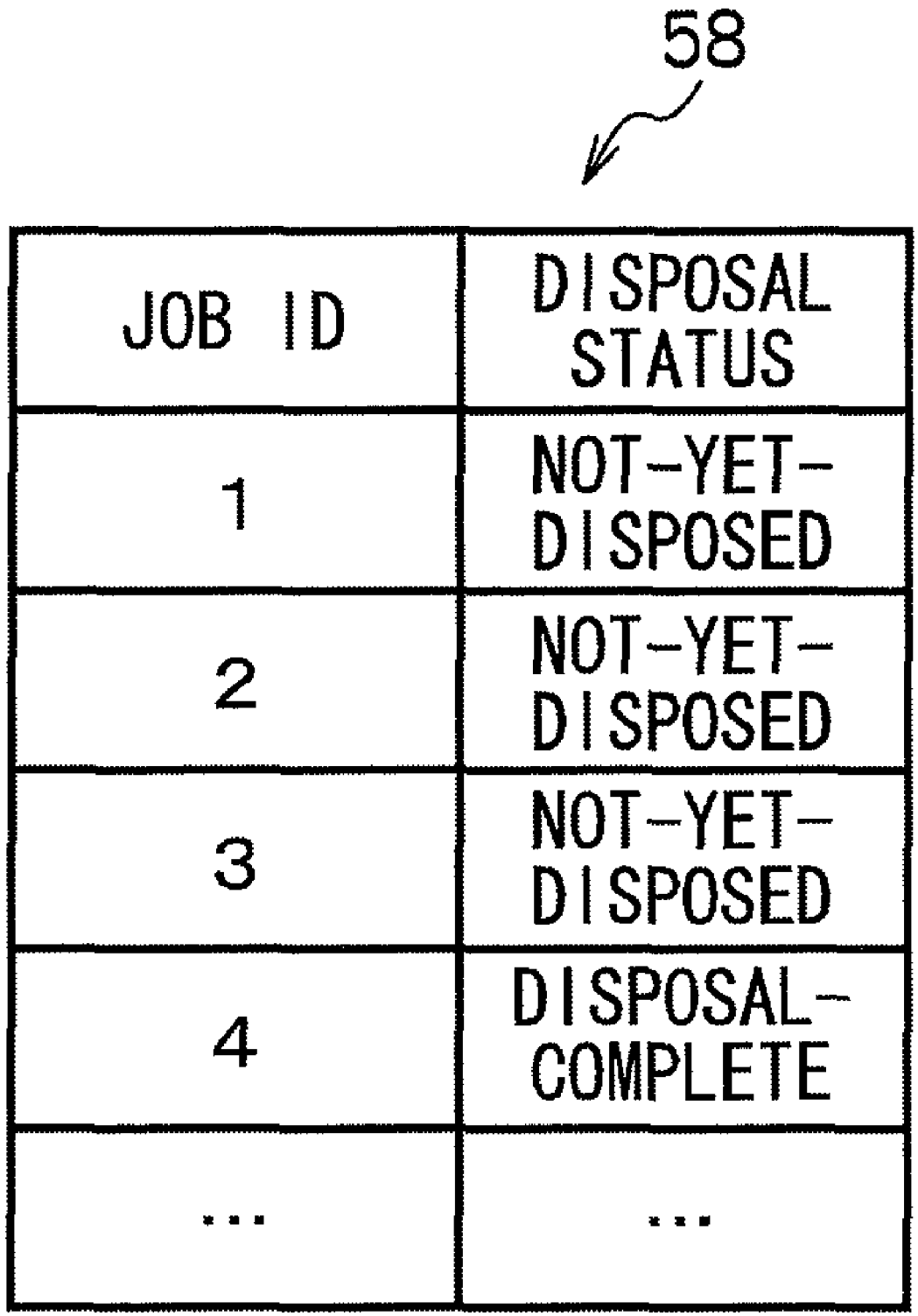
FIG. 4 is a diagram showing an example of document disposal information.

The CPU 42 generates the document disposal information 58, like that shown in FIG. 4, representing the correspondence relationship between the document ID and the disposal status of the document. When log information 56 is received relating to a given job the CPU 42 determines whether or not the input document ID or the output document ID of the job log information 52 included in the received log information 56 is included in the document disposal information 58. When the input document ID or the output document ID of the job log information 52 is not included therein, the CPU 42 adds the information to show that that document is not yet disposed to the document disposal information 58. In this manner information representing the disposal status of documents related to a given job is added to the document disposal information 58 each time the job is executed by the image forming device 12.

The storage unit 40 is, for example, configured by a hard disk or the like, and stores the log information 56, the document disposal information 58, the tree information 60, and a later described control program 62. It should be noted that a control program may be stored on a storage medium such as a CD-ROM, with the control program being read out and executed from such a storage medium. A control program sent from another device connected to the network 18 may also be received and executed.

The document disposal device 16 is configured to include a document ID read-in unit 64, a document disposal unit 66, and disposal document ID output unit 68.

The document ID read-in unit 64 has similar functionality to that of the input document ID read-in unit 26 of the image forming device 12, and the ID of a document is read in before that document is disposed of by the document disposal unit 66.

The read-in ID is sent as a disposal document ID to the image log management device 14 by the disposal document ID output unit 68.

When the CPU 42 of the image log management device 14 receives the disposal document ID, the CPU 42 compares the disposal document ID with the document disposal information 58 stored in the storage unit 40, and rewrites the information to show the disposal status of the disposal document ID to be that of a disposal-complete document.

The document disposal unit 66 disposes of the document for which the ID has been read in by the document ID read in unit 64. Document disposal does not only refer to disposal by shredding of a paper document itself, but also includes deletion of the document data stored in a storage device such as a hard disk.

Figure 5:
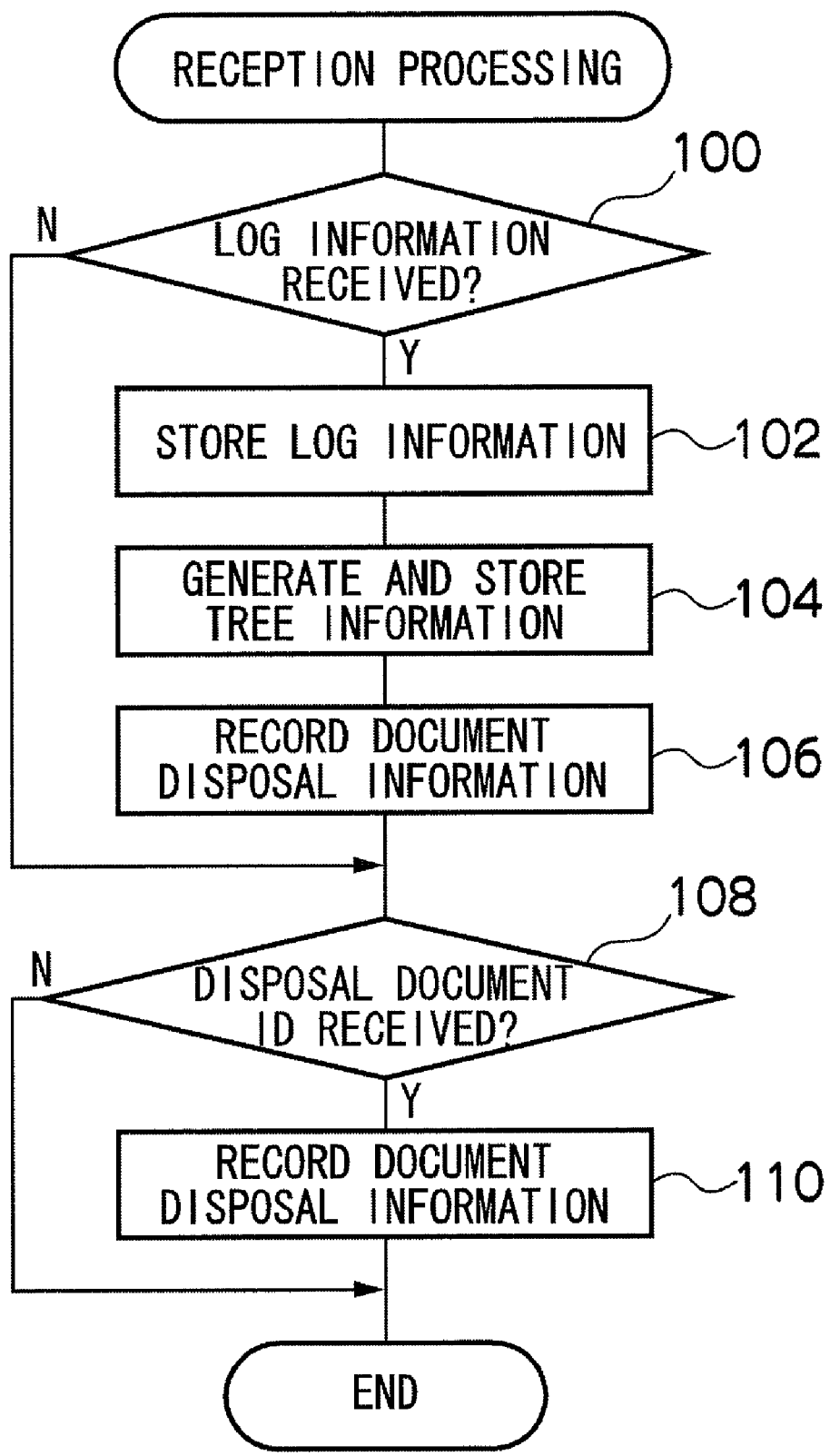
FIG. 5 is a flow chart of reception processing according to the first exemplary embodiment of the present invention.

Explanation will now be given of the operation of the present exemplary embodiment by the processing executed in the CPU 42 of the image log management device 14. Explanation will first be made of the log information 56 and the disposal document ID reception processing, with reference to the flow chart shown in FIG. 5. As an example this processing is carrying out at specific intervals of time.

The receiving unit 36 determines at step 100 whether or not the log information 56 has been received from the image forming device 12, and when the log information 56 has been received the routine proceeds to step 102, and when log information has not been received the routine proceeds to step 108. The receiving unit 36 may be configured to request new log information 56 from the image forming device 12, or configured to obtain the log information 56 from the image forming device 12 when there is no log information 56 received.

The log information 56 containing the job log information 52 and the image log data 54 is stored in the storage unit 40 at step 102.

The tree information 60 is generated at step 104 and stored in the storage unit 40. Namely, the tree information 60 is generated by extracting from the log information 56 the job ID, and the input document ID, output document ID, and image log ID therefor, and adding a tree ID representing the relationship between documents and job, and adding location information of the image log, namely image log location information representing the storage address of the image log on the storage unit 40.

If the tree information 60 includes the same input document ID or the same output document ID as the input document ID of the received log information 56, the same tree ID is applied as the tree ID of the input document ID or output document ID that is the same. Namely, when the received log information 56 is log information 56 of an input document of a document included in an existing tree, the tree ID of that tree is applied thereto. However, a new tree ID is applied when there is no input document ID or output document ID included in the tree information 60 which is the same document ID as the input document ID of the log information 56, namely when the input document ID is not contained within any one of the existing trees. In such cases the input document of that job becomes the root document of the tree.

Figure 6:
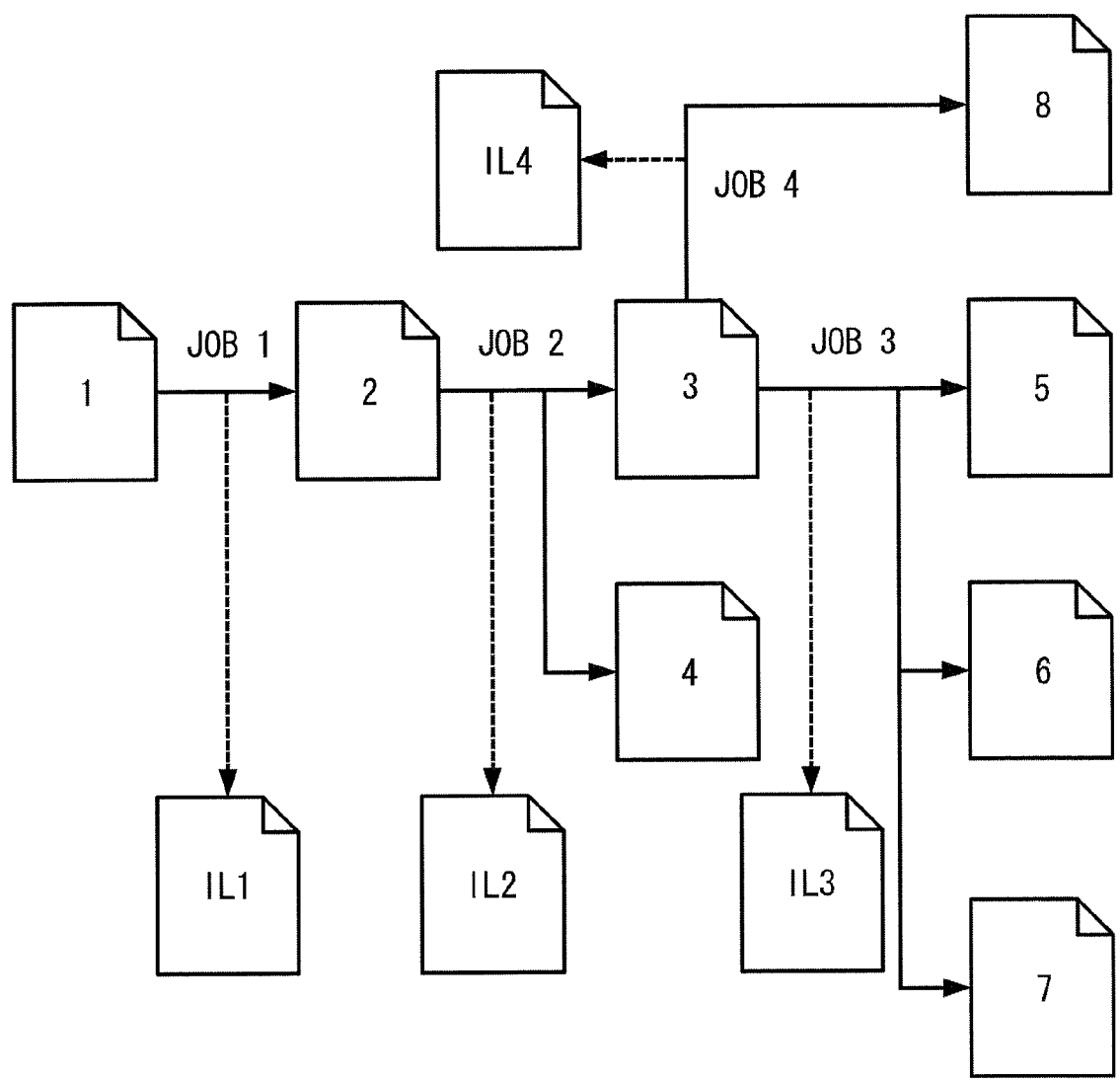
FIG. 6 is a diagram showing an example of a tree showing the relationships between jobs and documents.

A schematic diagram is shown in FIG. 6 of the tree information 60 configured as shown in FIG. 3. Each of the numbers shown in FIG. 6 represents an ID and a code. As shown in FIG. 6, job 1 (job ID=1) executes a specific job (for example copying) on the input document 1 (job ID=1), and the output document ID "2" is applied to the document output by executing the job. In addition an image log IL1 (image log ID=1) is generated by the execution of job 1, and stored in the storage unit 40.

In a similar manner, job 2 executes a specific job on the input document 2, and the output document IDs "3" and "4" are applied to the two documents output by executing job 2. In addition an image log IL2 is generated by the execution of job 2, and stored in the storage unit 40. A case in which plural output documents are output from a single job is, for example, such as when plural copies of an input document are made.

By storing the tree information 60 it becomes possible, when a given document is leaked, to identify who, when, and what type of document was output from what type of job by using the ID applied to the document and with reference to the tree information 60 and the image log data 54.

The disposal status of the output document of the received log information 56 is recorded at step 106 in the document disposal information 58. Namely, information is recorded in the document disposal information 58 showing that the disposal status of the output document newly output by the job is a not-yet-disposed status.

Determination is made in step 108 whether or not a disposal document ID of a document disposed from the document disposal device 16 has been received, and when such a disposal document ID has been received the routine proceeds to step 110, and the current routine is terminated when not received.

The disposal status of the document of the received disposal document ID is recorded in the document disposal information 58 at step 110. Namely, information is recorded in the document disposal information 58 showing that the disposal status of the disposal document is a disposal-complete status.

Figure 7B:
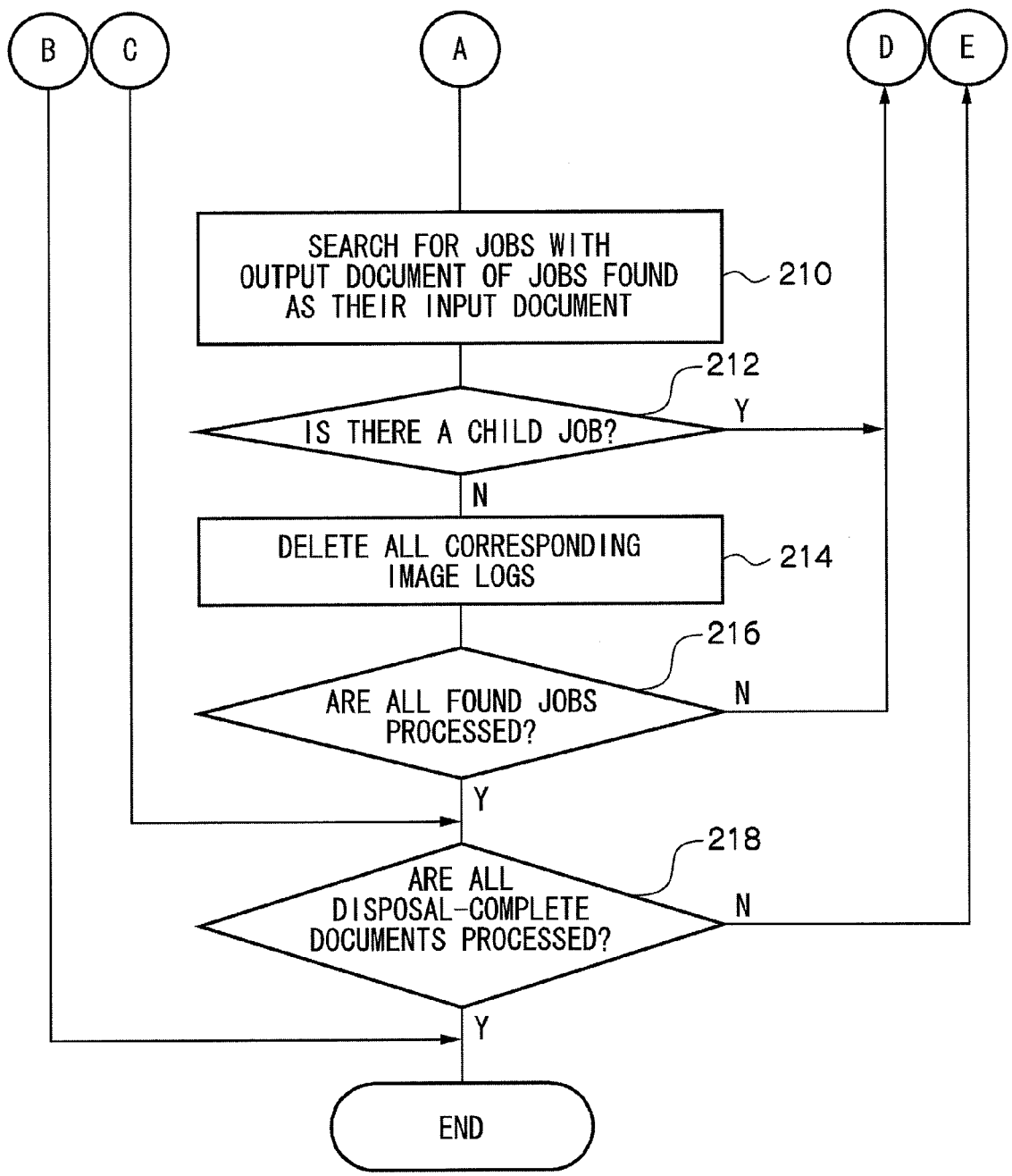

Explanation will next be given of deletion processing of the image log executed by the CPU 42, with reference to the flow charts shown in FIG. 7A and FIG. 7B. When, in the present exemplary embodiment, a given document has been disposed of by the document disposal device 16 and all of the output document(s) from jobs with the given document as the input document have been disposed of, and all output documents with a descendant relationship such output document(s) have been disposed of, in order that this document ceases to exist as early as possible so as not to be leaked and since the need to save the image log data 54 of these job is low, the image log data 54 for these jobs is deleted. The processing shown in FIGS. 7A and 7B is executed at specific periodic intervals. The above documents with a descendant relationship to a document relate to first generation output documents that have been generated by executing a specific job to which the given document is the input document, as well as to second generation output documents that have been generated by executing a specific job for which one of the first generation output documents is the input document. A document is said to have a descendant relationship to a given document if it is a first generation output documents or second generation output documents. For example, in the schematic diagram of a tree in FIG. 6, if the document with ID 2 is the parent document, then the output document 3 and output document 4 generated from the input document 2 are called child documents. The output documents 5 to 8 generated with the child document output document 3 as the input document correspond to child documents with the output document 3 as the parent document. Namely, when the input document 2 is considered as the parent document then these output documents 5 to 8 are grandchild documents thereto, and the output documents 3 to 8 are said to have a descendant relationship to the input document 2.

First, at step 200, a search is made for whether or not there are any disposal-complete documents, with reference to the document disposal information 58 stored in the storage unit 40. Namely, a search is made for document IDs in the document disposal information 58 for which the "disposal status" is "disposal-complete".

Determination is made in step 202, based on the search results of step 200, as to whether or not there are any documents that are disposed, and when such a disposal-complete document exists the routine proceeds to step 204, and when no disposal-complete documents exist the current routine is terminated.

A search is made in step 204 for whether there are any jobs with the document of disposal-complete document ID as the input document, namely a search is made for jobs with an input document having the same ID as the disposal-complete document ID, by reference to the tree information 60 stored in the storage unit 40.

Determination is made in step 206, based on the search results of step 204, as to whether or not there are any jobs with an input document having the same ID as the disposal-complete document ID, and when such a job exists, the routine proceeds to step 208, and when no such job exists, the routine proceeds to step 218.

A search is made at step 208 for whether or not all of the output documents of the job that has been found are disposal-complete documents, by reference to the document disposal information 58. Namely, a search is made for all of the jobs found as to whether or not the disposal status is "disposal-complete" for documents with the same output document ID as that of the output documents from these jobs.

When all of the output documents from the jobs found in step 204 are disposal-complete then the routine proceeds to step 210, and when even one job exists that is not disposal-complete then the routine proceeds to step 218.

A search is made at step 210 for whether there is a job with the output document of the found jobs as the input document thereto, with reference to the tree information 60. Namely, a search is made for the existence or not of a "child" of the found job.

Determination is made at step 212 of whether or not a "child" of the found job exists, based on the search results of step 210, and when there is such a job the routine returns to step 208 and similar processing to the above is repeated, and when there is no such job, the routine proceeds to step 214. Namely, the routine proceeds to step 214 when all of the output documents of the jobs with the disposal-complete documents found in step 200 as input documents have a disposal-complete status and all of the output documents with a descendant relationship to all of these output documents have a disposal-complete status.

At step 214, all of the image log data 54 generated in jobs with the disposal-complete documents found in step 200 as input documents thereto and the image log data 54 generated in jobs executed subsequent thereto are deleted from the storage unit 40.

Determination is made at step 216 whether or not the processing of the steps 208 to 214 has been executed for all of the jobs found in step 204, and the routine returns to step 208 when there are jobs still to be processed and the similar processing to that above is repeated, and the routine proceeds to step 218 when all of the jobs have been processed.

Determination is made at step 218 whether or not the above processing has been executed for all of the disposal-complete documents found in step 200, and the routine returns to step 204 when there are disposal-complete documents still to be processed and similar processing to that above is repeated, and the current routine is terminated when the above processing has been undertaken for all of the disposal-complete documents.

Explanation will now be given of a specific example of deleting the image log.

Figure 8:
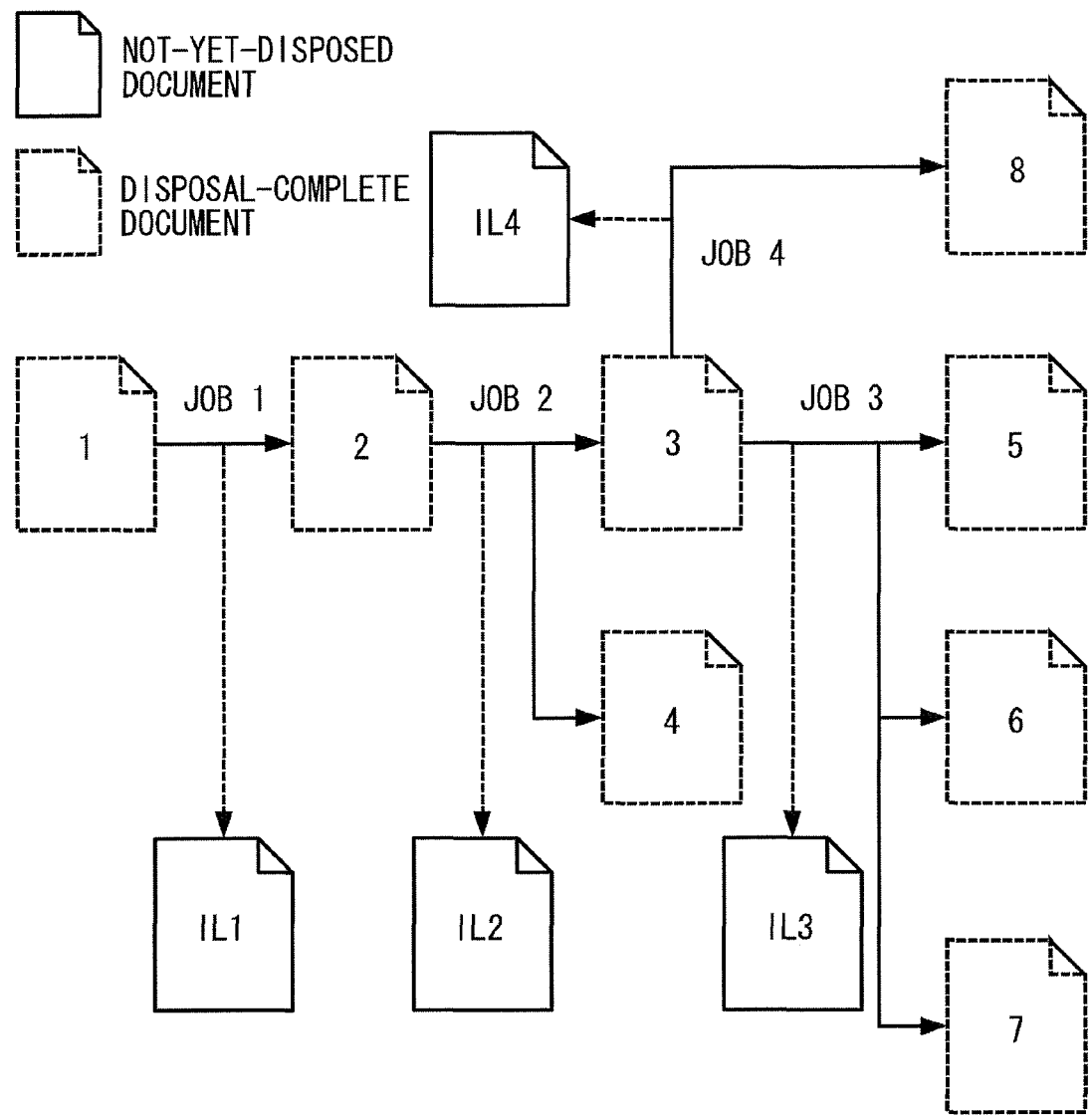
FIG. 8 is a diagram showing an example of a tree showing the relationships between jobs, not-yet-disposed documents and disposal-complete documents.

A schematic diagram is shown in FIG. 8 of the image tree configured by the tree information 60 shown in FIG. 3, with the solid lines showing not-yet-disposed documents and the intermittent lines showing disposal-complete documents.

In this example, as shown in FIG. 8, all of the documents 1 to 8 are in the disposal-complete status. Namely, all of the output documents output from jobs generated from job 1, which has document 1 as the input document, onwards are in the disposal-complete status. Consequently, in such a case all of the image logs generated for each of these jobs, namely the image logs IL1 to IL4, are deleted.

Figure 9:
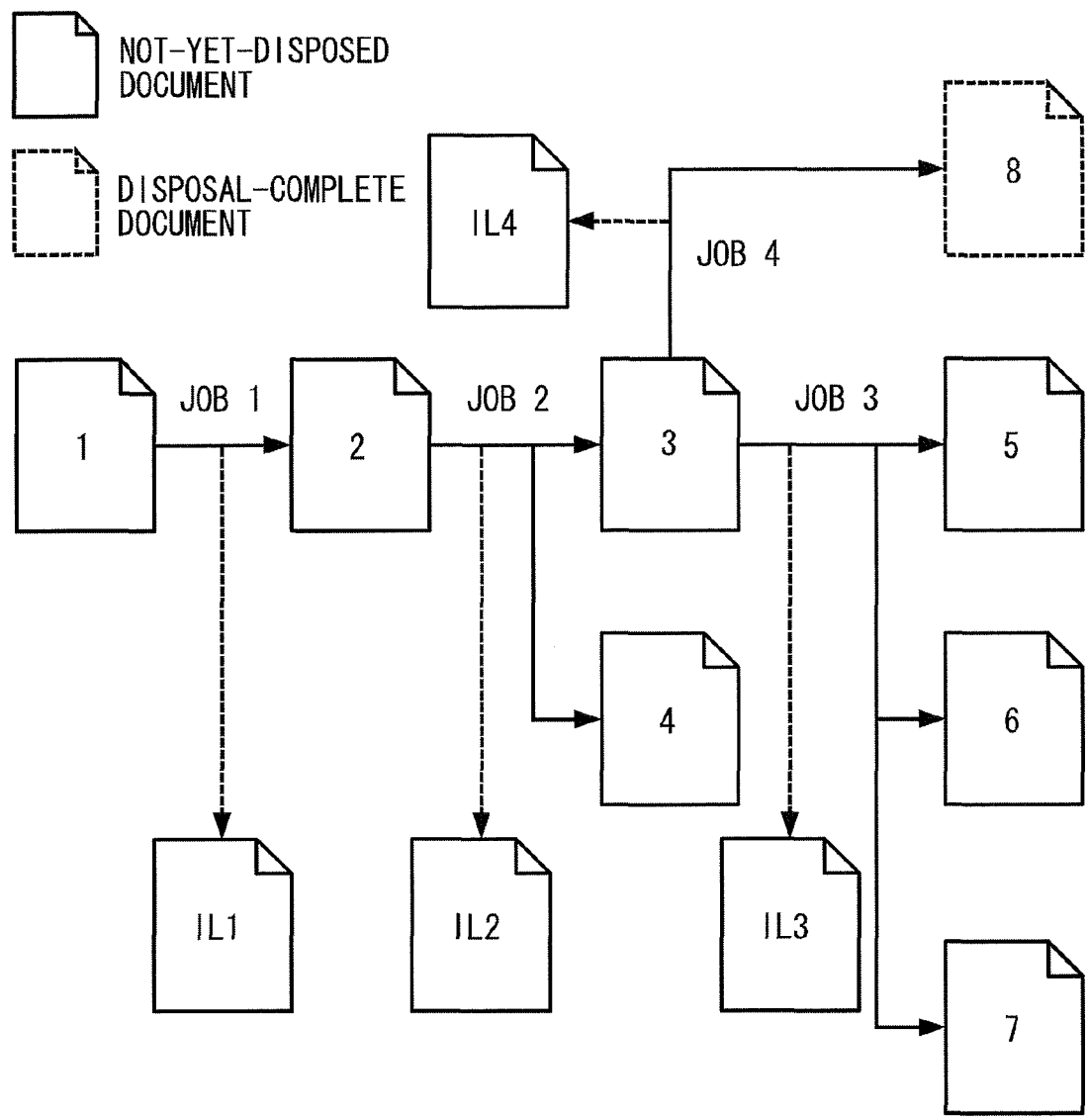
FIG. 9 is a diagram showing an example of a tree showing the relationships between jobs, not-yet-disposed documents and disposal-complete documents.

In the example shown in FIG. 9, document 8, being the output document from job 4, is in the disposal-complete status. However, the image log IL4 is not deleted since document 3, being the input document of job 4, is not in the disposal-complete status.

Figure 10:
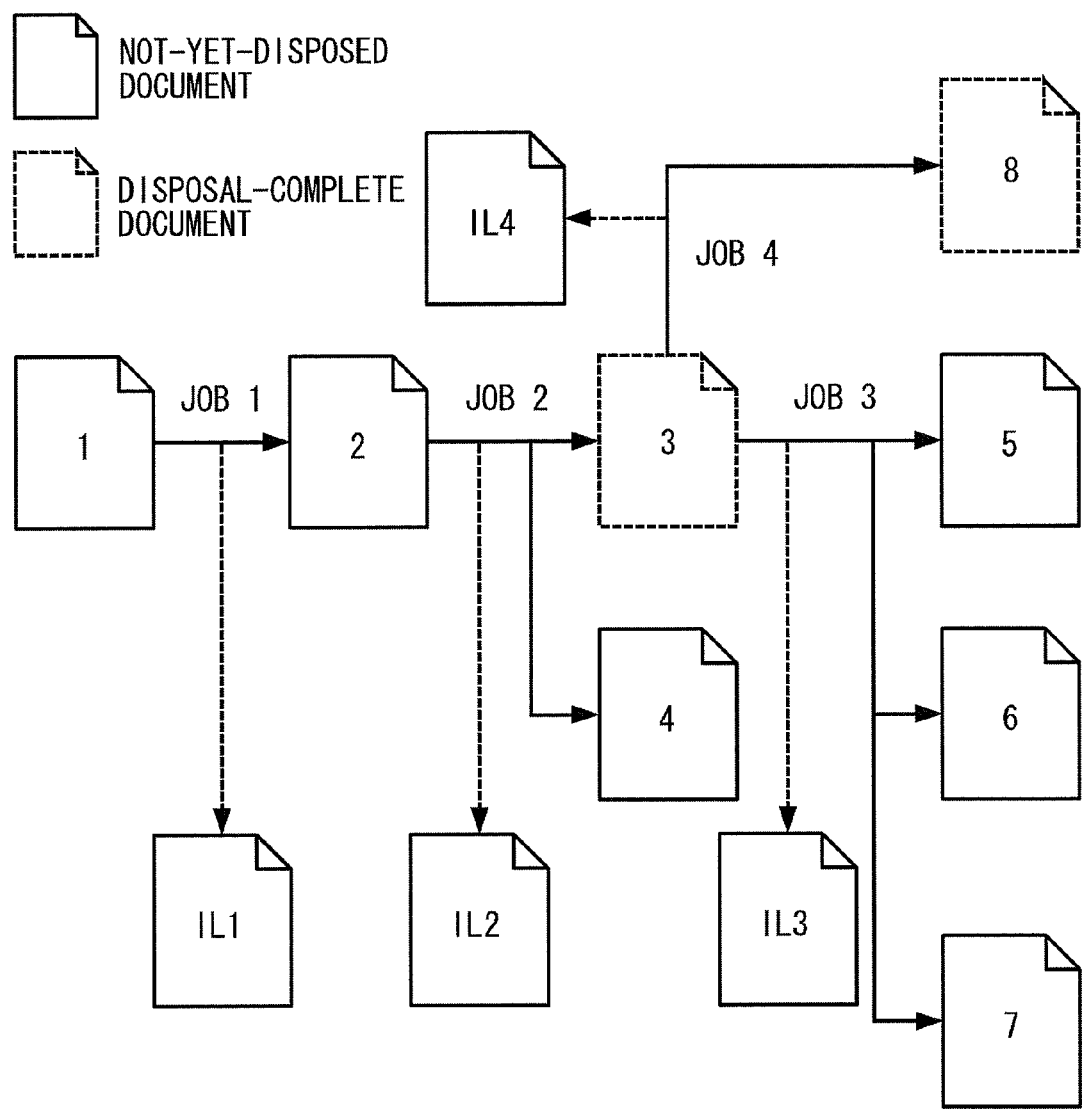
FIG. 10 is a diagram showing an example of a tree showing the relationships between jobs, not-yet-disposed documents and disposal-complete documents.

In the example shown in FIG. 10, document 3, the input document to job 4, and document 8, the output document from job 4, are in the disposal-complete status. Since there are no jobs with document 8 as the input document thereto the image log IL4 is deleted.

Figure 11:
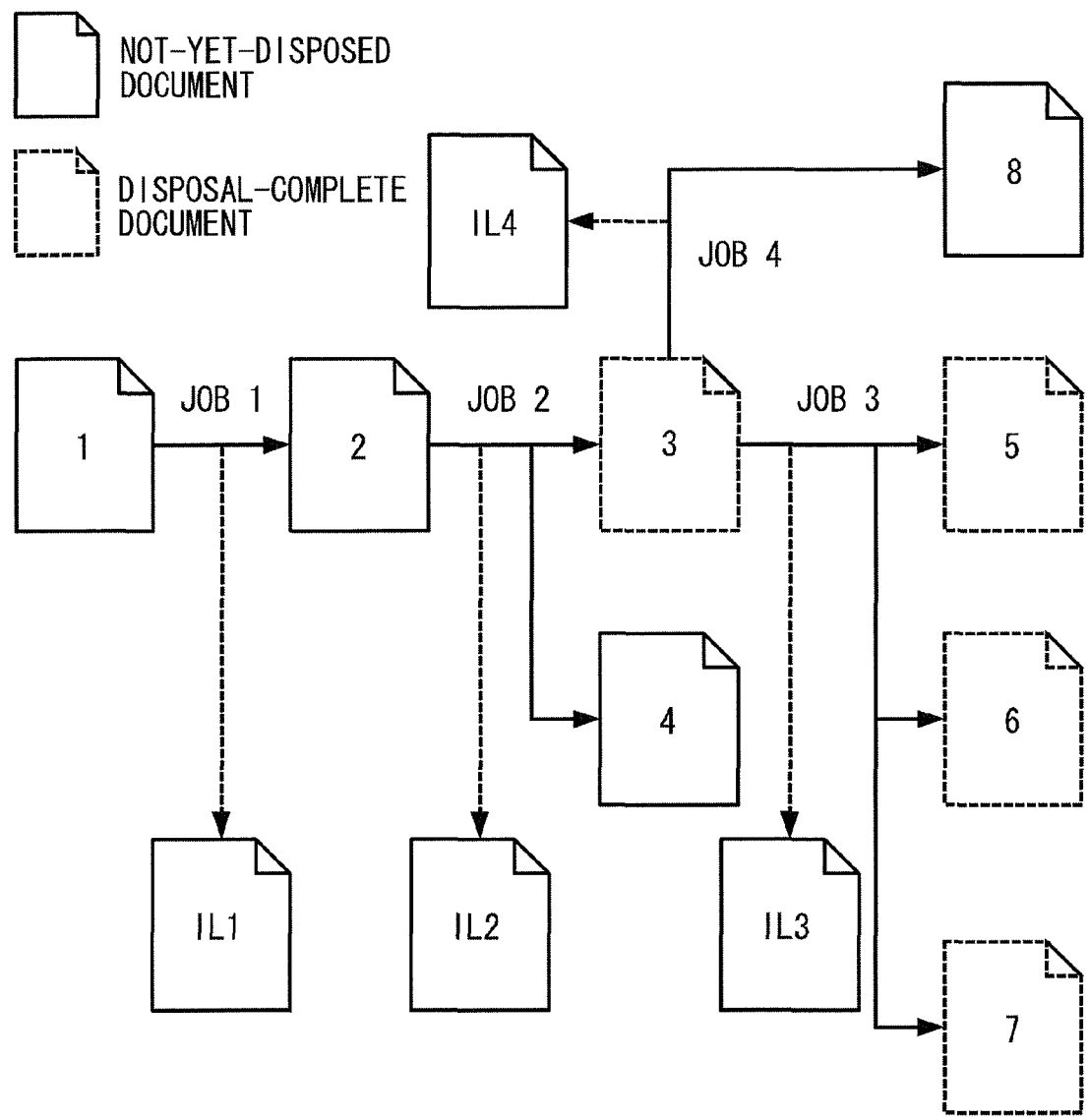
FIG. 11 is a diagram showing an example of a tree showing the relationships between jobs, not-yet-disposed documents and disposal-complete documents.

In the example shown in FIG. 11, document 3, the input document to job 3, and the output documents from this job, documents 5 to 7, are in the disposal-complete status. Since there are also no jobs with documents 5 to 7 as the input document thereto the image log IL3 is deleted. It should be noted that document 3 is the input document to job 4, and the image log IL4 is not deleted since document 8, the output document from this job, is not in the disposal-complete status.

Figure 12:
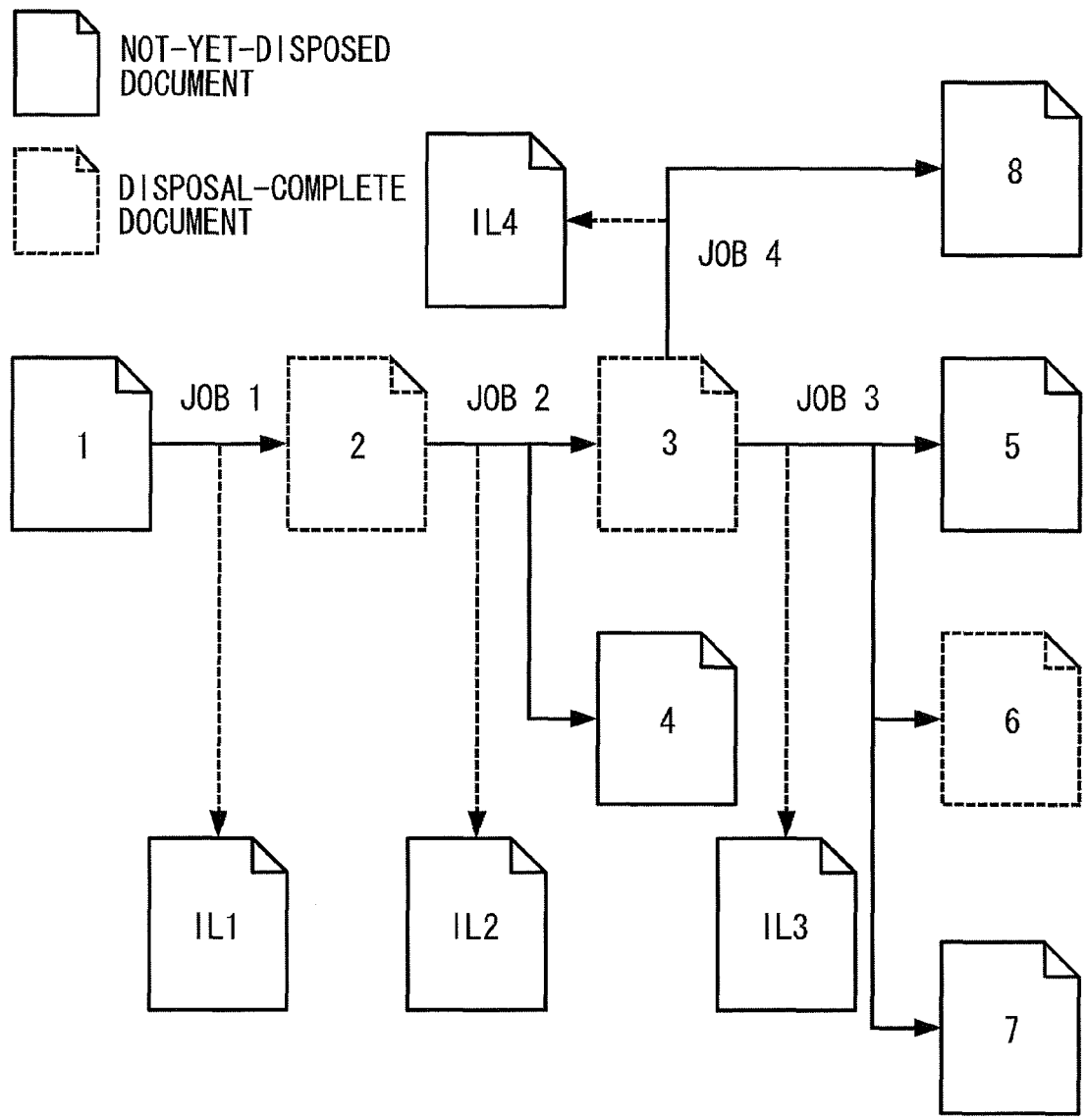
FIG. 12 is a diagram showing an example of a tree showing the relationships between jobs, not-yet-disposed documents and disposal-complete documents.

In the example shown in FIG. 12, document 2, the input document to job 2, and the output document from this job, document 3, and document 6, the output document of job 3 having document 3 as the input document thereto, are in the disposal-complete status.

However, the image logs IL2 and IL3 are not deleted since the other output document of job 2, document 4, and the other output documents of job 3, documents 5 and 7, are not in the disposal-complete status, and none of the image logs are deleted.

It should be noted that whereas the present exemplary embodiment is configured with the log information 56 and the document disposal information 58 stored in the storage unit 40 of the image log management device 14, configuration may be made with the log information 56 and the document disposal information 58 stored on another device connected to the network 18.

Second Exemplary Embodiment

Explanation will now be given of a second exemplary embodiment of the present invention. Similar elements thereof to those of the first exemplary embodiment are allocated the same reference numerals and detailed explanation thereof will be omitted.

The image log management system according to the present exemplary embodiment is similar to the image log management system 10 of FIG. 1A and FIG. 1B, and therefore explanation thereof will be omitted. The reception processing executed in the CPU 42 is also similar to that shown in FIG. 5 and so detailed explanation thereof will be omitted.

Figure 13A:
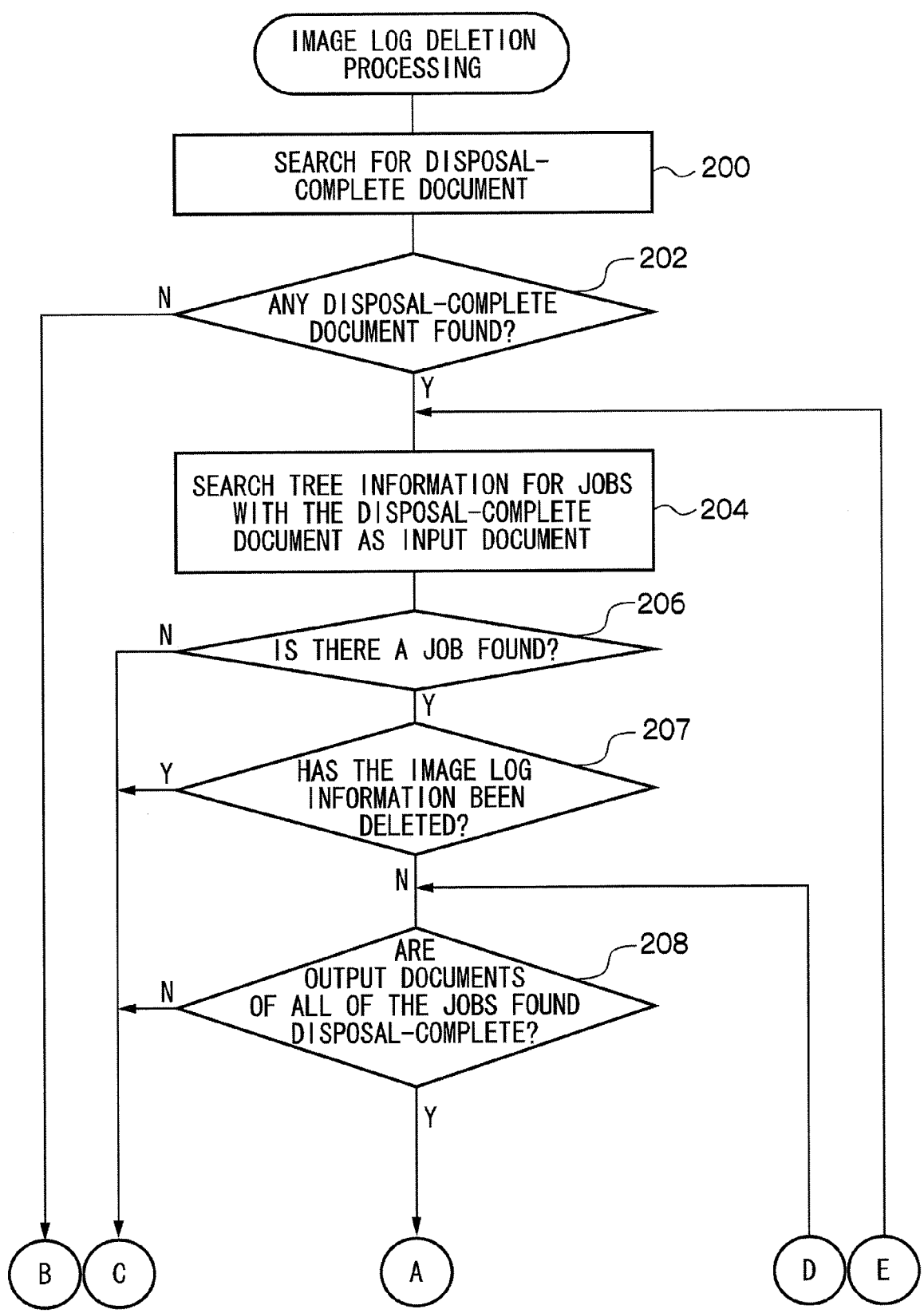
FIG. 13A and FIG. 13B are flow charts showing image log deletion according to a second exemplary embodiment of the present invention.
Figure 13B:
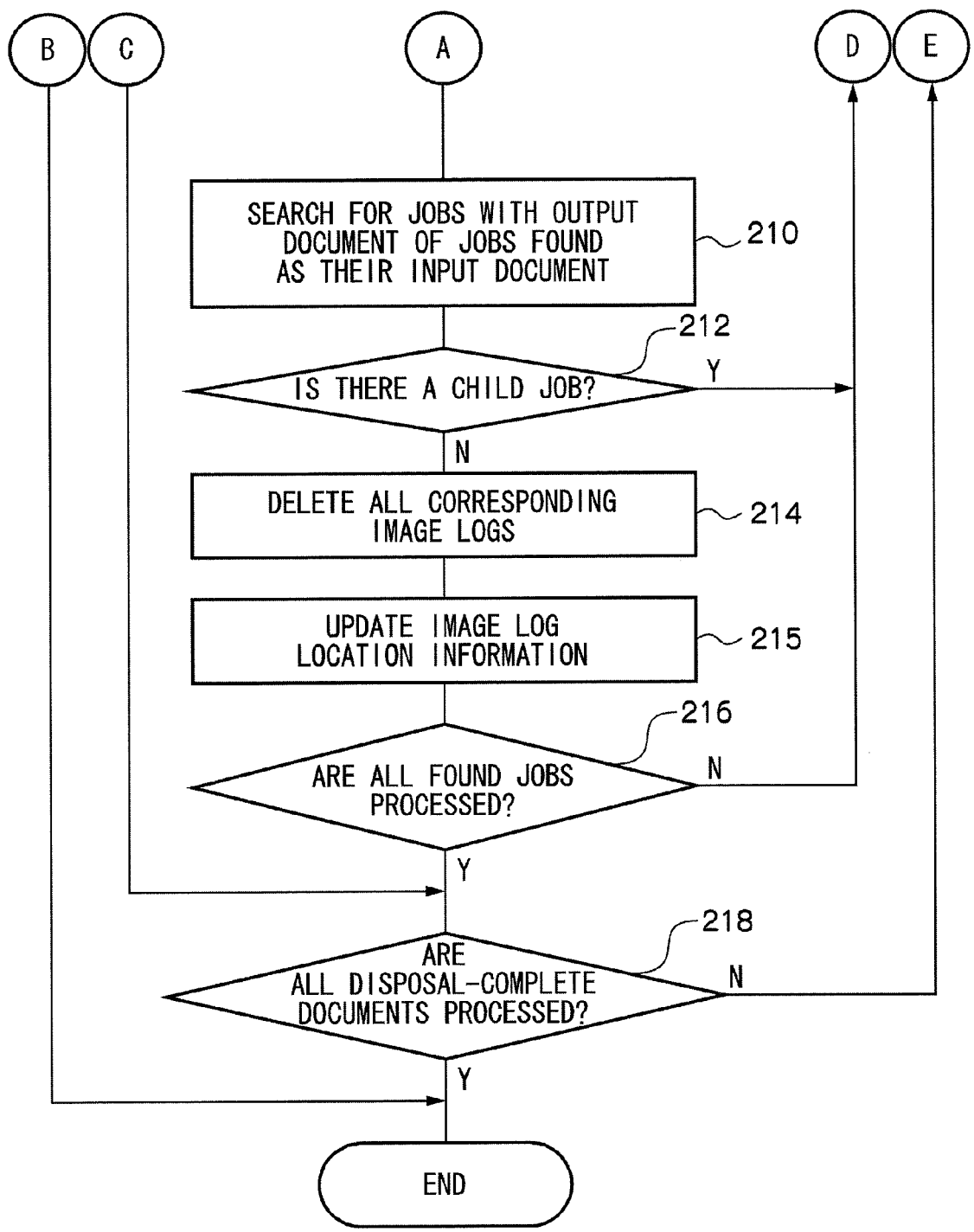

Explanation will next be given of the deletion processing executed in the CPU 42, with reference to the flow chart of FIG. 13A and FIG. 13B. The processing shown in FIG. 13A and FIG. 13B is different to that of FIG. 7A and FIG. 7B only in that the steps 207 and 215 have been added, and explanation of the processing of the other steps will be omitted.

As stated above, at step 214, when all of the output documents of the jobs with the disposal-complete documents as input documents thereto have been disposed of and all of the output documents with a descendant relationship to all such output documents have been disposed of, all of the image log data 54 for these jobs are deleted.

Then, at step 215, the image log location information of the deleted image log is rewritten with information to show disposal-complete status. If, for example as shown in FIG. 11, the image log IL 3 has been deleted, then information is rewritten showing the image log location information as "disposal-complete", as shown in FIG. 14.

In this manner, since the image log location information is rewritten when an image log is deleted, when it is determined at step 206 that there is a job with a disposal-complete document as the input document thereto, whether or not the image log of that job has been deleted is determined at step 207 with reference to the image log location information.

There is then no need to immediately search to see whether or not documents with a descendant relationship to this job are disposed, since if the image log of that job has been deleted this means that the image log of jobs with a descendant relationship to that job have also been deleted. Consequently, when it is determined in the affirmative at step 207 the routine proceeds to step 218, and when that the image log information is determined not to have been deleted the routine proceeds to step 208. The number of steps in the processing is thereby reduced in comparison to if information indicating the image log location information as "disposal-complete" is not rewritten.

It should be noted that it is possible for the image log location information not to be rewritten at step 215 when the image log has been deleted, and for information indicating the disposal-complete status of the image log to be added to the tree information 60, and at step 207 for determination to be made as to whether or not the image log is disposed of by reference to this tree information.

Third Exemplary Embodiment

Explanation will now be given of a third exemplary embodiment of the present invention. Similar elements thereof to those of the first exemplary embodiment are allocated the same reference numerals and detailed explanation thereof will be omitted.

The image log management system according to the present exemplary embodiment is similar to the image log management system 10 of FIG. 1A and FIG. 1B, and therefore explanation thereof will be omitted. The reception processing executed in the CPU 42 is also similar to that shown in FIG. 5 and so detailed explanation thereof will be omitted.

Figure 15B:
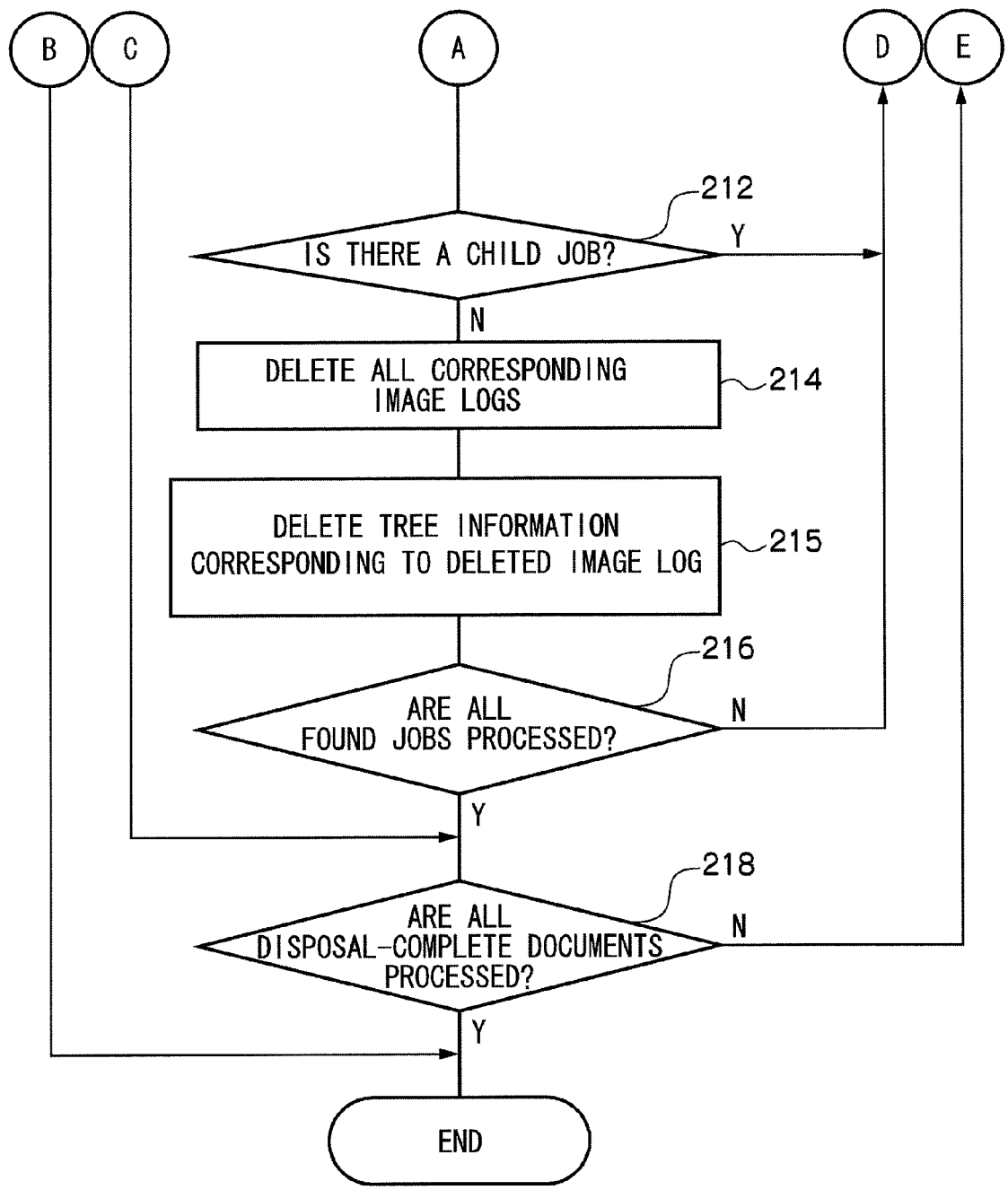

Explanation will next be given of the deletion processing executed in the CPU 42, with reference to the flow chart of FIG. 15A and FIG. 15B. The processing shown in FIG. 15A and FIG. 15B is different to that of FIG. 7A and FIG. 7B only in that the step 215 has been added, and explanation of the processing of the other steps will be omitted.

As stated above, at step 214, when all of the output documents of the jobs with the disposal-complete documents as input documents thereto have been disposed of and all of the output documents with a descendant relationship to all of these output documents have been disposed of, all of the image log data 54 for these jobs is deleted.

Then, at step 215, the image log location information corresponding to the deleted image log is deleted. If, for example as shown in FIG. 11, the image log IL 3 has been deleted for the job 3 having the disposal-complete document 3 as the input document and having the disposal-complete documents 5 to 7 as the output documents, then the tree information of the job 3 is deleted, as shown in FIG. 16.

Consequently, when job 3 is found in the next time of the current routine at step 200, since the tree information is already deleted relating to the job 3, which has the disposal-complete document 3 as the input document, the number of jobs found in step 204 is reduced and the number of steps of processing is reduced in comparison to when the tree information is not deleted.

Fourth Exemplary Embodiment

Explanation will now be given of a fourth exemplary embodiment of the present invention. Similar elements thereof to those of the first exemplary embodiment are allocated the same reference numerals and detailed explanation thereof will be omitted.

The image log management system according to the present exemplary embodiment is similar to the image log management system 10 of FIG. 1A and FIG. 1B, and therefore explanation thereof will be omitted.

Figure 17:
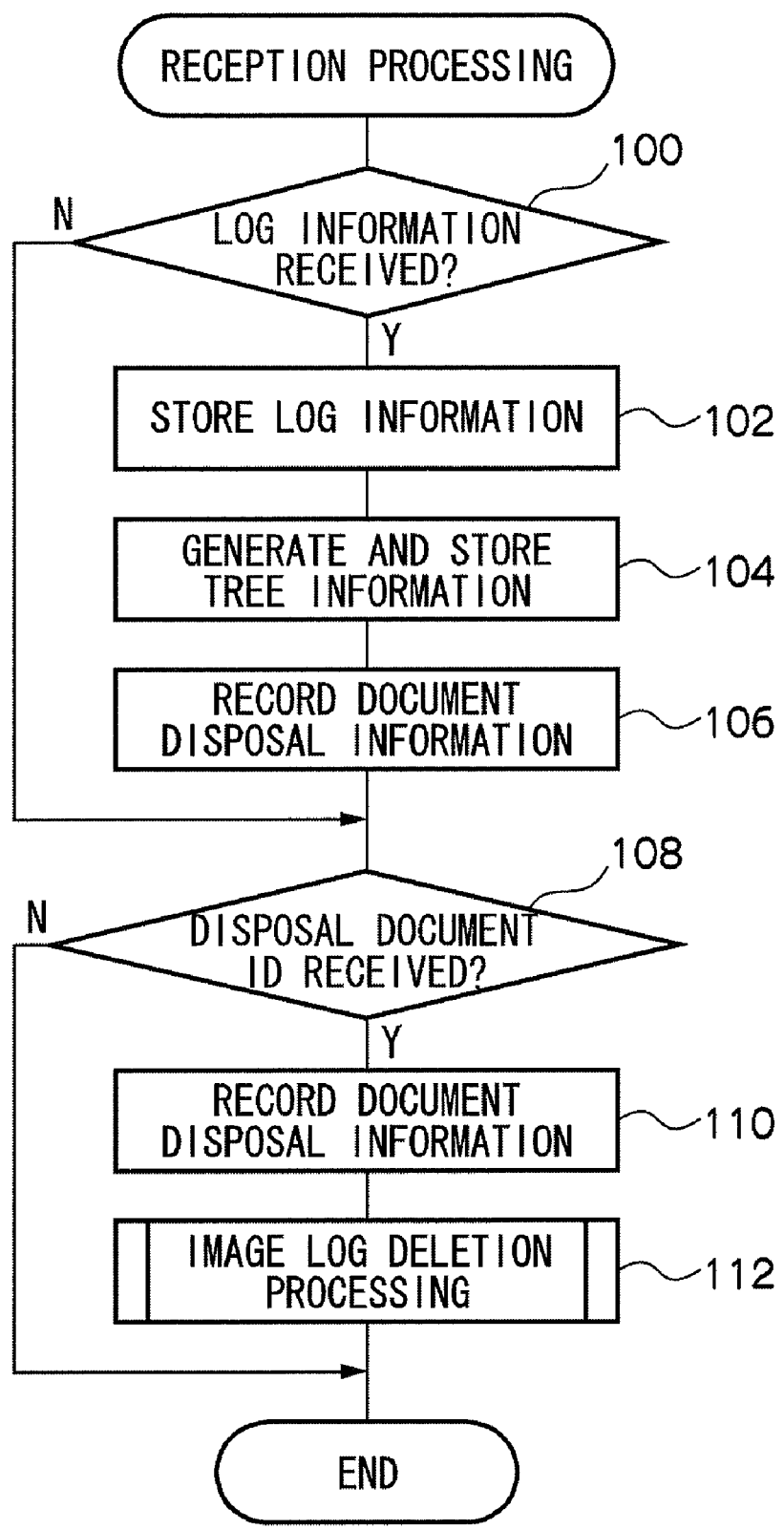
FIG. 17 is a flow chart showing reception processing according to a fourth exemplary embodiment of the present invention.

Explanation will next be given of the reception processing executed in the CPU 42, with reference to the flow chart of FIG. 17. The processing shown in FIG. 17 is different to that of FIG. 5 only in that at step 110, after recording the document disposal information relating to the document of the received disposal document ID, image log deletion processing is executed in step 112. Namely, image log deletion processing is executed each time a disposal document ID is received.

Figure 18:
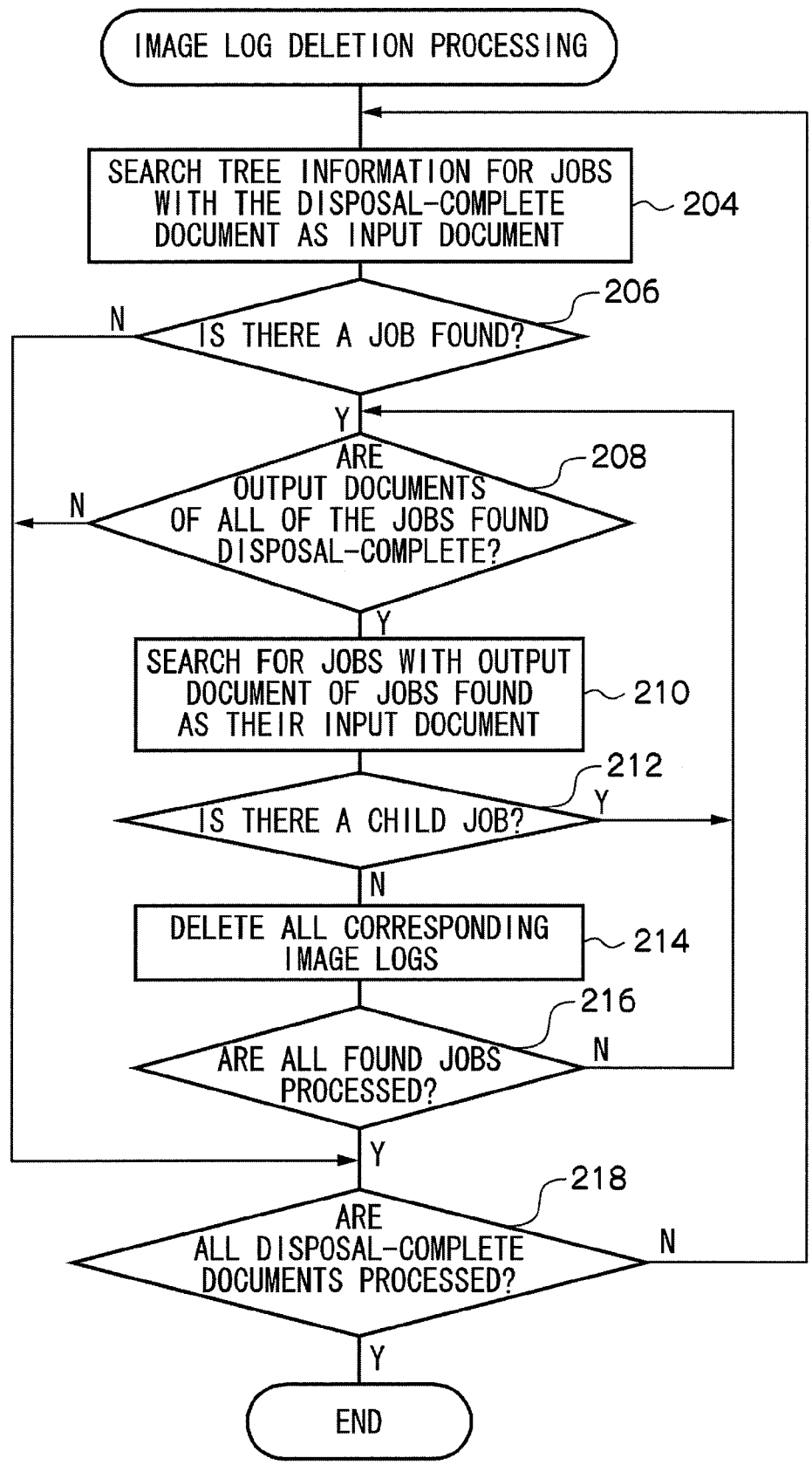
FIG. 18 is a flow chart showing image log deletion processing according to the fourth exemplary embodiment of the present invention.

Explanation will next be given of the deletion processing executed in the CPU 42, with reference to the flow chart of FIG. 18. The processing shown in FIG. 18 is different to that of FIG. 7A and FIG. 7B only in that the steps 200 and 202 are omitted. Namely, searching on the basis of the document disposal information 58 of the disposal-complete documents is omitted since the image log deletion processing is executed each time that a document data is received in the processing of FIG. 17.

It should be noted that the steps 200 and 202 may also be omitted from the processing shown in FIG. 13A, FIG. 13B, FIG. 15A and FIG. 15B, as well as from the processing shown in FIG. 18.

What is claimed is:

1. An image log management device comprising:
    a processor;
    a correspondence relationship information storing component, executed on the processor, that stores correspondence relationship information between an identifier of an input document subject to image forming processing, an identifier of one or more output documents resulting from the image forming processing of the input document, and an identifier of image log data of the one or more output documents;
    an image log data storage component that stores the image log data of the one or more output documents;
    an input component that inputs document disposal information including an identifier of a disposal document that has been disposed of;
    a document disposal information component that, based on the document disposal information, changes a status of a document corresponding to the disposal document to disposal-complete; and
    a deletion component that, based on the status of the document corresponding to the document disposal information and based on one or more identifiers of input or output documents stored in the correspondence relationship information, selects image log data requiring deletion and executes deletion processing thereon,
    wherein when all of the one or more output documents, processed by the image forming processing with the disposal document as the input document, have their respective status changed to disposal-complete, the deletion component deletes the image log data of the one or more output documents.

2. The image log management device of claim 1, wherein when all of the one or more output documents, processed by the image forming processing with the disposal document as the input document, have their respective status changed to disposal-complete, and all other output documents with a descendant relationship to the one or more output documents have their respective status changed to disposal-complete, the deletion component completely deletes the image log data of the one or more output documents and the image log data of the other output documents.

3. The image log management device of claim 1, wherein when the deletion component has deleted the image log data, deletion information representing that the image log data has been deleted is associated with the identifier of the deleted image log data and stored in the correspondence relationship information storing component.

4. The image log management device of claim 1, wherein when the image log data has been deleted the deletion component deletes the correspondence relationship information related to the deleted image log data.

5. The image log management device of claim 1, wherein the deletion component executes deletion processing each time the document disposal information is entered.

6. An image log management method comprising:
    (a) storing correspondence relationship information between an identifier of an input document subject to image forming processing, an identifier of one or more output documents resulting from the image forming processing of the input document, and an identifier of image log data of the one or more output documents;
    (b) storing the image log data of the one or more output documents;
    (c) inputting document disposal information including an identifier of a disposal document that has been disposed of;
    (d) changing, based on the document disposal information, a status of a document corresponding to the disposal document to disposal-complete; and
    (e) selecting, based on the status of the document corresponding to the document disposal information and based on one or more identifiers of input or output documents stored in the correspondence relationship information, image log data requiring deletion and executing deletion processing thereon,
    wherein when all of the one or more output documents, processed by the image forming processing with the disposal document as the input document, have their respective status changed to disposal-complete, the image log data of the one or more output documents is deleted.

7. The image log management method of claim 6, wherein when all of the one or more output documents, processed by the image forming processing with the disposal document as the input document, have their respective status changed to disposal-complete, and all other output documents with a descendant relationship to the one or more output documents have their respective status changed to disposal-complete, the image log data of the one or more output documents and the image log data of the other documents is deleted.

8. The image log management method of claim 6, wherein when the image log data has been deleted, deletion information representing that the image log data has been'deleted is associated with the identifier of the deleted image log data and stored.

9. The image log management method of claim 6, wherein when the image log data has been deleted the correspondence relationship information related to the deleted image log data is deleted.

10. The image log management method of claim 6, wherein deletion processing is executed each time the document disposal information is entered.

11. A storage medium readable by a computer, the storage medium storing a program of instructions executable by the computer to perform a function for image log management, the function comprising the steps of:
    (a) storing correspondence relationship information between an identifier of an input document subject to image forming processing, an identifier of one or more output documents resulting from the image forming processing of the input document, and an identifier of image log data of the one or more output documents;
    (b) storing the image log data of the one or more output documents;
    (c) inputting document disposal information including an identifier of a disposal document that has been disposed of;
    (d) changing, based on the document disposal information, a status of a document corresponding to the disposal document to disposal-complete; and
    (e) selecting, based on the status of the document corresponding to the document disposal information and based on one or more identifiers of input or output documents stored in the correspondence relationship information, image log data requiring deletion and executing deletion processing thereon, wherein when all of the one or more output documents, processed by the image forming processing with the disposal document as the input document, have their respective status changed to disposal-complete, the image log data of the one or more output documents is deleted.

12. The storage medium of claim 11, wherein when all of the one or more output documents, processed by the image forming processing with the disposal document as the input document, have their respective status changed to disposal-complete, and all other output documents with a descendant relationship to the one or more output documents have their respective status changed to disposal-complete, the image log data of the one or more output documents and the image log data of the other documents is deleted.

13. The storage medium of claim 11, wherein when the image log data has been deleted, deletion information representing that the image log data has been deleted is associated with the identifier of the deleted image log data and stored.

14. The storage medium of claim 11, wherein when the image log data has been deleted the correspondence relationship information related to the deleted image log data is deleted.

15. The storage medium of claim 11, wherein deletion processing is executed each time the document disposal information is entered.

16. The storage medium of claim 11, wherein the image log data comprises a representation of the one or more output documents.

17. The image log management device of claim 1, wherein the image log data comprises a representation of the one or more output documents.

18. The image log management method of claim 6, wherein the image log data comprises a representation of the one or more output documents.

* * * * *